United States Patent [19]

Nishii et al.

[11] Patent Number: 5,024,492
[45] Date of Patent: Jun. 18, 1991

[54] HYDRAULIC BRAKING SYSTEM FOR AN AUTOMOTIVE VEHICLE

[75] Inventors: Michiharu Nishii, Toyota; Genji Mizuno, Toyoake; Yoshihisa Nomura, Toyota; Masahiko Kato, Nagoya, all of Japan

[73] Assignees: Aisin Seiki Kabushiki Kaisha, Kariya; Toyota Jidosha Kabushiki Kaisha, Toyota, both of Japan

[21] Appl. No.: 386,250

[22] Filed: Jul. 28, 1989

[30] Foreign Application Priority Data

Jul. 30, 1988 [JP] Japan .................. 63-191475

[51] Int. Cl.⁵ .............................. B60T 13/12
[52] U.S. Cl. ..................... 303/114; 303/9.62
[58] Field of Search ............ 303/113, 114, 115, 116, 303/119, 9.62, 61; 60/551, 565, 574

[56] References Cited

U.S. PATENT DOCUMENTS

| | | | |
|---|---|---|---|
| 4,578,951 | 4/1986 | Belart et al. | 303/114 |
| 4,678,243 | 7/1987 | Leiber | 303/114 X |
| 4,779,935 | 10/1988 | Kuwana et al. | 303/117 |
| 4,800,724 | 1/1989 | Asahara et al. | 60/560 |
| 4,805,967 | 2/1989 | Arikawa | 303/116 |
| 4,810,042 | 3/1989 | Kono et al. | 303/114 X |
| 4,812,777 | 3/1989 | Shirai | 303/9.62 |
| 4,819,997 | 4/1989 | Reinartz et al. | 303/114 X |
| 4,838,621 | 6/1989 | Furuta et al. | 303/114 X |
| 4,842,344 | 6/1989 | Kuwana et al. | 303/117 |
| 4,846,535 | 7/1989 | Kuwana et al. | 303/117 |
| 4,859,004 | 8/1989 | Nishii | 303/119 |
| 4,865,398 | 9/1989 | Takeuchi et al. | 303/115 |

FOREIGN PATENT DOCUMENTS

62-39354 2/1987 Japan .
62-155167 7/1987 Japan .
2179109 2/1987 United Kingdom .

Primary Examiner—Matthew C. Graham
Attorney, Agent, or Firm—Burns, Doane, Swecker & Mathis

[57] ABSTRACT

A hydraulic braking system for an automotive vehicle having a power source for generating a hydraulic power pressure, a reservoir, a master cylinder, a hydraulic booster for actuating the master cylinder in response to depression of a brake pedal and a plurality of wheel brake cylinders for braking respective road wheels, which are divided into a first group of wheel brake cylinders communicating with the master cylinder and a second group of wheel brake cylinders communicating with the hydraulic booster. An auxiliary cylinder is disposed between the hydraulic booster and the second group of wheel brake cylinders. The auxiliary cylinder includes a cylinder body having a cylinder bore defined therein and a piston axially slidably disposed within the cylinder bore. The piston forms within the cylinder bore a first chamber and a second chamber, and blocks a fluid communication therebetween. The first chamber communicates with the hydraulic booster and the second chamber communicates with the second group of wheel brake cylinders to which a braking force is applied in response to operation of the hydraulic booster. Thereby, the brake fluid filled in the hydraulic booster is prevented from flowing out, even if leakage of the brake fluid occurs in the second group of wheel brake cylinders.

9 Claims, 3 Drawing Sheets

HYDRAULIC BRAKING SYSTEM FOR AN AUTOMOTIVE VEHICLE

BACKGROUND OF THE INVENTION

1. Field of the Invention

The present invention relates to a hydraulic braking system for use in an automotive vehicle, and more particularly to a hydraulic braking system which has a hydraulic booster for actuating a master cylinder in response to operation of a manually-operated member with a hydraulic power pressure supplied from a power source, and in which a first group of wheel brake cylinders communicates with the master cylinder and a second group of wheel brake cylinders communicates with the hydraulic booster.

2. Description of the Prior Art

In conventional service braking systems for an automotive vehicle, there are provided a plurality of hydraulic circuits connecting wheel brake cylinders mounted on road wheels with a hydraulic braking pressure generator such as a master cylinder, so that when one of the hydraulic circuits is broken, braking operation is performed by the rest of the hydraulic circuits. In general, a tandem master cylinder is used in a conventional dual circuits system.

In order to reduce a force required to operate a manually-operated member, for example a depressing force applied on a brake pedal in braking operation, the hydraulic braking system is provided with a servo unit which is referred as a servo or a booster and which utilizes compressed air, intake manifold vacuum (for a vacuum booster), or hydraulic pressure (for a hydraulic booster) as a power source. The hydraulic booster is a booster which actuates the hydraulic braking pressure generator such as the master cylinder by the hydraulic power pressure supplied from the power source in response to depression of the brake pedal.

It has been proposed to employ the hydraulic booster, in the hydraulic braking system, as a dynamic hydraulic braking pressure generator in addition to the master cylinder In other words, a hydraulic pressure generated by the hydraulic booster in response to depression of the brake pedal is applied directly to one of the hydraulic circuits. For example, as shown in Japanese Patent Laid-open Publication No. 59-227552, the hydraulic pressure generated by the hydraulic booster is applied to rear wheel brake cylinders in a front-rear dual circuits system in order to reduce the stroke of the brake pedal.

However, in the above-described hydraulic braking system, the hydraulic pressure generated by the hydraulic booster is applied to each of the rear wheel brake cylinders as it is, so that if any of the rear wheel brake cylinders or a hydraulic circuit communicating therewith is damaged, the brake fluid filled in the hydraulic booster and the hydraulic circuit communicating therewith may leak therefrom. In this case, with a brake force applied sufficiently on the normal front road wheels, necessary braking operation may be performed. However, since the hydraulic pressure generated by the hydraulic booster disappears, boosting operation is not performed, so that a large depressing force shall be applied on the brake pedal.

SUMMARY OF THE INVENTION

Accordingly, it is an object of the present invention to provide a hydraulic braking system for an automotive vehicle which prevents leakage of brake fluid filled in a hydraulic circuit communicating with a hydraulic booster even if wheel brake cylinders communicating with the hydraulic booster ar damaged.

It is another object of the present invention to provide a hydraulic braking system having an auxiliary cylinder which is disposed between a hydraulic booster and a group of wheel brake cylinders, and which transmits a braking force to the wheel brake cylinders and prevents leakage of the brake fluid from the hydraulic booster.

It is a further object of the present invention to provide a hydraulic braking system which is easily and economically provided with means for performing an anti-locking operation and an anti-slip operation.

It is yet a further object of the present invention to provide a hydraulic braking system in which only one proportioning valve may be disposed.

In accomplishing these and other objects, a hydraulic braking system for an automotive vehicle according to the present invention comprises a power source for generating a hydraulic power pressure, a reservoir for storing an amount of brake fluid, a master cylinder for introducing the brake fluid thereinto from the reservoir and generating a hydraulic braking pressure in response to operation of a manually-operated member, a hydraulic booster for actuating the master cylinder by the hydraulic power pressure supplied from the power source in response to operation of the manually-operated member, a plurality of wheel brake cylinders for braking respective road wheels, which is divided into a first group of wheel brake cylinders communicating with the master cylinder through a first hydraulic circuit and a second group of wheel brake cylinders communicating with the hydraulic booster through a second hydraulic circuit. The hydraulic braking system further includes an auxiliary cylinder which is disposed in the second hydraulic circuit and which comprises a cylinder body having a cylinder bore defined therein and a piston axially slidably disposed within the cylinder bore. The piston forms within the cylinder bore two chambers of a first chamber and a second chamber, and blocks a fluid communication therebetween. The first chamber communicates with the hydraulic booster and the second chamber communicates with the second group of wheel brake cylinders.

In the above-described hydraulic braking system, the piston of the auxiliary cylinder preferably forms within the cylinder bore third chamber which communicates with the reservoir through a drain circuit, and the piston is preferably equipped with a valve mechanism which normally communicates the second chamber with the third chamber, and blocks therebetween when a hydraulic pressure supplied from the hydraulic booster to the first chamber exceeds a hydraulic pressure in the second chamber.

The above-described hydraulic braking system may include a proportioning valve which is disposed in the second hydraulic circuit at a point thereof between the hydraulic booster and the first chamber of the auxiliary cylinder. The hydraulic braking system may also include a bypass circuit which connects a point of the second hydraulic circuit between the proportioning valve and the first chamber of the auxiliary cylinder to a point of the second hydraulic circuit between the second chamber of the auxiliary cylinder and the second group of wheel brake cylinders, and a normally-closed valve which is disposed in the bypass circuit and which normally shuts off the bypass circuit.

BRIEF DESCRIPTION OF THE DRAWINGS

The above stated objects and following description will become readily apparent with reference to the accompanying drawings, wherein like reference numerals denote like elements, and in which.

DESCRIPTION OF THE PREFERRED EMBODIMENTS

Figure 1:
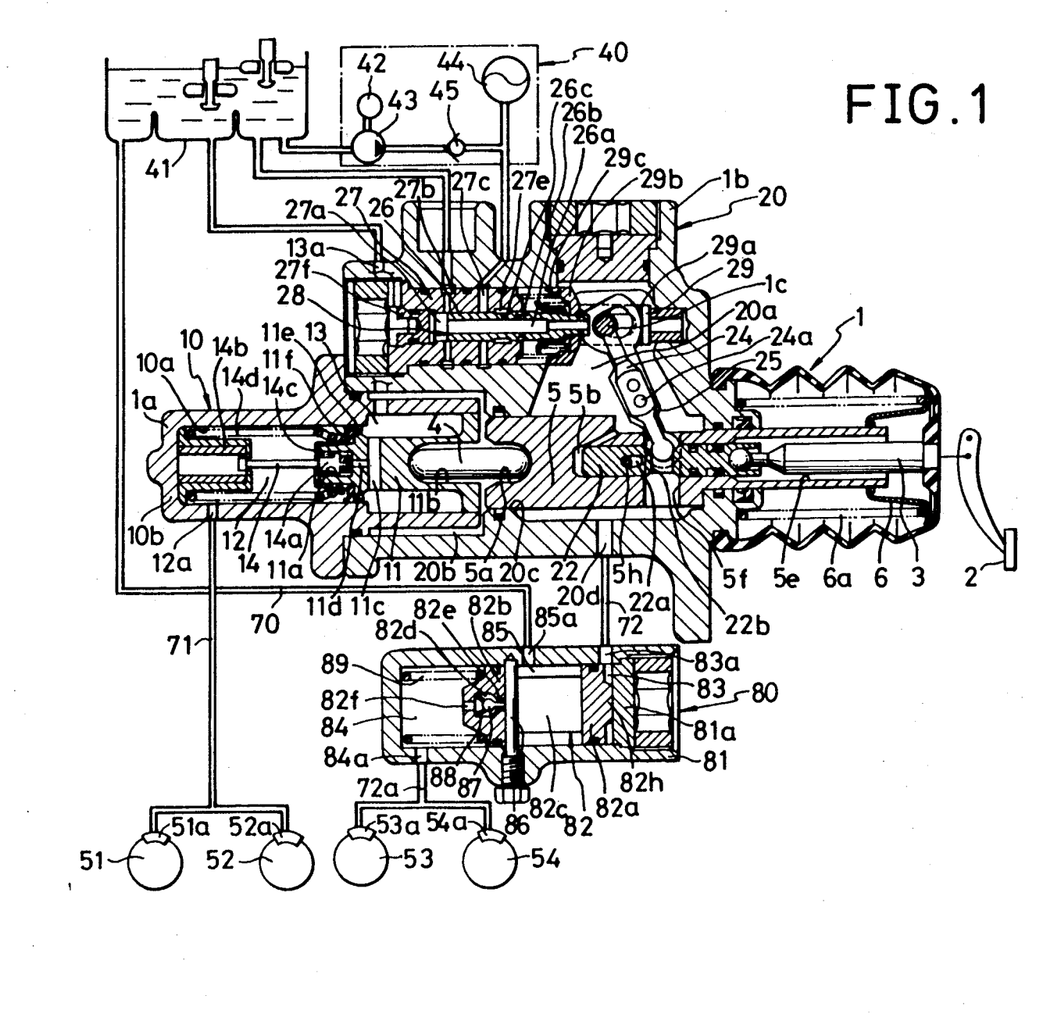
FIG. 1 is a schematic illustration of a hydraulic braking system of a first embodiment of the present invention with a sectional view of a hydraulic pressure generator and an auxiliary cylinder.

Referring to FIG. 1, there is illustrated a hydraulic braking system of an embodiment of the present invention, which includes a hydraulic pressure generator (hereinafter referred to simply as a pressure generator) 1 having a master cylinder 10 and a hydraulic booster 20. A power source 40 and a reservoir 41 are connected to the pressure generator 1. A depressing force applied on a brake pedal 2 which is provided as a manually-operated member is transmitted as a braking force to the pressure generator 1. In response to this braking force, a hydraulic pressure is generated by the pressure generator 1 and applied to wheel brake cylinders 51a to 54a mounted on front road wheels 51, 52 through a hydraulic circuit 71 provided as a first hydraulic circuit and rear road wheels 53, 54, through hydraulic circuits 72, 72a provided as a second hydraulic circuit, and an auxiliary cylinder 80 which will be described later in detail.

As for the master cylinder 10, a master piston 11 is fluid-tightly and slidably disposed in a cylinder bore 10a defined in a housing 1a. The master piston 11 has a smalldiameter land portion and a large-diameter land portion, and the cylinder bore 10a is formed as a stepped bore having corresponding small-diameter and large-diameter portions. In the large-diameter portion of the cylinder bore 10a, a fluid chamber 13 is defined between the small-diameter land portion and the large-diameter land portion of the master piston 11, and in the small-diameter portion of the cylinder bore 10a, a pressure chamber 12 is defined between the small-diameter land portion of the master piston 11 and a closed end portion 10b. The pressure chamber 12 communicates with the passage 71 via a port 12a, and the fluid chamber 13 communicates with the reservoir 41 via a port 13a.

The master piston 11 has a pair of holes 11a, 11b extending axially from its opposite ends toward its center, and a hole 11c formed radially. The hole 11a communicates with the hole 11c via a small hole 11d formed axially. Also, a hole 11e is formed axially in a peripheral portion of the master piston 11, and covered by a cup seal 11f at its end open to the pressure chamber 12, whereby a check valve is formed. A valve member 14a mounted on one end of the valve rod 14 is slidably received in the hole 11a of the master piston 11 in opposing relation to the small hole 11d, and the valve member 14a is restricted from moving toward the closed end portion 10b by a retainer 14c. A large-diameter portion of the other end of the valve rod 14 is slidably disposed in a retainer 14b, and restricted from moving toward the master piston 11. An output rod 4 is disposed in the hole 11b of the master piston 11. A return spring 14d is mounted between the retainers 14b and 14c so as to normally bias the master piston 11 away from the closed end portion 10b. Therefore, the opposite ends of the valve rod 14 are normally in engagement with the respective retainers 14b, 14c.

Thus, the valve member 14a and the small hole 11d are spaced from each other, brake fluid supplied from the reservoir 41 to the fluid chamber 13 via the port 13a is filled in the pressure chamber 12 via the hole 11e of the master piston 11, and the hole 11c, the small hole 11d and the hole 11a. When the master piston 11 is moved toward the closed end portion 10b against the biasing force of the return spring 14d, the hole 11e is closed by the cup seal 11f and the small hole 11d is closed by the valve member 14a so that the pressure chamber 12 is held in the closed state except the port 12a. Accordingly, the pressure of the brake fluid is increased in response to movement of the master piston 11.

In a housing 1b joined with the housing 1a, a boost chamber 20a and a low-pressure chamber 20b of the hydraulic booster 20 are defined, and a power piston 5 is fluid-tightly and slidably disposed in a bore 20c which is formed between the boost chamber 20a and the low-pressure chamber 20b, and which is substantially coaxial with the cylinder bore 10a. The power piston 5 is provided with retainer 6 at its end extending toward the brake pedal 2, and a spring 6a is mounted between the retainer 6 and the housing 1b so as to normally bias the power piston 5 toward the brake pedal 2. The power piston 5 has at its middle portion a shoulder portion which abuts on the housing 1b to restrict the power piston 5 from sliding toward the brake pedal 2. In the power piston 5, there are formed a recess 5a at the end facing the master piston 11, a bore 5b and a bore 5e which is larger in diameter than the bore 5b. A communication hole is formed in the bottom of the bore 5b, and a reaction piston 22 is slidably received in the bore 5b.

In the reaction piston 22, there is formed an elongated hole 22a extending coaxially with the axis of the reaction piston 22, and a through-hole 22b extending perpendicularly to the elongated hole 22a. A pin 5h fixed to the power piston 5 is disposed in the elongated hole 22a, so that the reaction piston 22 is restricted from sliding at least toward the brake pedal 2 with respect to the power piston 5. One end of an input rod 3 is connected to the brake pedal 2, and the other end of the input rod 3 is provided with a spherical head which is inserted in the bore 5e of the power piston 5 and received in the recess of the reaction piston 22, and which is engaged with the projection formed on the inner surface of the recess. In the power piston, there is formed radially a through-hole 5f which is aligned with the through-hole 22b when the reaction piston 22 is positioned most closely to the brake pedal 2 and which is larger in diameter than the through-hole 22b. The output rod 4 is received in the recess 5a of the power piston 5. The output rod 4 is insented into the hole 11b so that its head portion abuts on the bottom of the hole 11b.

A support lever 24 is pivotally connected at its one end to the housing 1b by a pin 1c for pivotal movement within the boost chamber 20a, and a spherical head of the support lever 24 is fitted into the through-hole 22b of the reaction piston 22. And, one head of a control lever 25, which is pivotally connected with the support lever 24 by a pin 24a, is fitted into the through-hole 5f of the power piston 5. In the other head of the control lever 25, there is defined a hole around the pin 1c. Accordingly, when the reaction piston 22 slides toward the output rod 4 with respect to the power piston 5 which is urged toward the brake pedal 2, a rotating force is exerted on the support lever 24 so as to pivotally move the support lever 24 clockwise about the pin 1c. At that time, since one head of the control lever 25 is retained in the through-hole 5f of the power piston 5, the other head of the control lever 25 is rotated counterclockwise about the pin 24a and hence moved in the sliding direction of the reaction piston 22. As a result, the other head of the control lever 25 is displaced in response to movement of the reaction piston 22 until it comes into contact with the bottom of the bore 5b.

The housing 1b has a spool-valve bore extending substantially in parallel with the power piston 5 and communicating with the boost chamber 20a, and a spool valve 28 is fitted into the spool-valve bore. The spool valve 28 has a spool 26 which is slidably received in a spool bore 27a formed in a cylinder 27 substantially in parallel with the power piston 5. One end of the spool bore 27a is fluid-tightly plugged by a closure member 27f. In the spool 26, there is formed axially a hole 26a, and formed radially a hole 26b communicating with the hole 26a. One end of the spool 26 is positioned in the boost chamber 20a and connected to one end of a control rod 29. The other end of the control rod 29 is slidably mounted on a recess formed in the housing 1b, and the head of the control lever 25 is fitted into a through-hole 29a radially bored in the control rod 29. Between the cylinder 27 and a retainer 29b supported at one end of the control rod 29, a spring 29c is mounted so as to normally bias the spool 26 toward the pin 1c. The hole 26a normally opens to the boost chamber 20a at the junction of the spool 26 and the control rod 29. When the control lever is in its initial position, the hole 26a of the spool 26 communicates with the reservoir 41 through a hole 27b radially bored in the cylinder 27. Thus, the boost chamber 20a also communicates with the reservoir 41 and is filled with the brake fluid under the atmospheric pressure.

A hole 27c communicating with the power source 40 is formed in the cylinder 27 with a predetermined distance from the hole 27b toward the control rod 29. The hole 27c is normally closed by the peripheral surface of the spool 26. Between the hole 27c and the one end of the spool 26 facing the control rod 29, an annular groove 27e is formed on the inner surface of the cylinder 27, and an annular groove 26c is formed on the peripheral outer surface of the spool 26 in opposing relation to the annular groove 27e. When the spool 26 is moved toward the closure member 27f in response to movement of the control lever 25, the hole 27b of the cylinder 27 is closed. The hole 27c in turn faces the annular groove 26c of the spool 26, and the annular groove 27e faces the hole 26b. Consequently, the hole 27c communicates with the hole 26a.

Accordingly, the hydraulic power pressure of the power source 40 is introduced into the boost chamber 20a to increase the hydraulic pressure therein, so that the reaction force is thereby transmitted to the brake pedal 2 through the reaction piston 22, and simultaneously the increased hydraulic pressure is applied to the power piston 5. The power piston 5 moves until the pin 5h comes into contact with an end portion of the elongated hole 22a at maximum with respect to the reaction piston 22. Thereby, the relative position of the control lever 25 and the support lever 24 becomes that in its initial state. Accordingly, the control lever 25 is moved clockwise to retract the control rod 29 toward the brake pedal 2. Thereby, the hole 27c of the cylinder 27 is thereby closed, and in turn the hole 27b communicates with the hole 26a of the spool 26 to lower the hydraulic pressure in the boost chamber 20a so that the power piston 5 is moved toward the brake pedal 2. With this operation performed repeatedly, the hydraulic power pressure within the boost chamber 20a is regulated so as to boost the master cylinder 10.

The boost chamber 20a of the hydraulic booster 20 communicates with the auxiliary cylinder 80 through the hydraulic circuit 72. The auxiliary cylinder 80 is connected to one circuit of the dual circuits in the present embodiment, that is, it communicates with the wheel brake cylinders 53a, 54a mounted on the rear road wheels 53, 54 through the hydraulic circuit 72a. On the other hand, the pressure chamber 12 of the master cylinder 10 is connected to the other circuit, that is, it communicates with the wheel brake cylinders 51a, 52a mounted on the front road wheels 51, 52 through the hydraulic circuit 71.

The auxiliary cylinder 80 includes a cylinder body 81 having a cylinder bore defined therein and a piston 82 slidably received in the cylinder bore. A closure member 81a is inserted into an open end of the cylinder body 81, the cylinder bore of which is divided by the piston 82 into a first pressure chamber 83 and a second pressure chamber 84. A small-diameter portion is formed longitudinally in the middle portion of the piston 82, and two land portions 82a, 82b are formed on opposite ends of the piston 82, so that a fluid chamber 85 is defined therebetween within the cylinder body 81 as a third chamber. A head portion 82h is formed on the land portion 82a, so that a space is maintained in the first pressure chamber 83 even if the piston 82 is brought into contact with the closure member 81a.

In the middle small-diameter portion of the piston 82, radially bored is an elongated hole 82c, through which a shaft 86 is disposed and fixedly attached to the cylinder 81. In the land portion 82b of the piston 82, there is defined a valve chamber 82d which communicates with the fluid chamber 85 and the second pressure chamber 84 through communication holes 82e, 82f respectively, and which receives a valve member 87 to provide a valve mechanism. The valve member 87 has a spherical head to be seated on an opening of the communication hole 82e and a rod extending from the spherical head into the communication hole 82e in spaced relationship therewith, and is biased toward the communication hole 82e by a spring 88. The valve member 87 is so arranged that when the head portion 82h of the piston 82 abuts on the closure member 81a, the rod of the valve member 87 comes into contact with the shaft 86 and the spherical head of the valve member 87 is held away from the communication hole 82e. The piston 82 is biased by a spring 89 provided in the cylinder body 81 in such direction that the land portion 82b comes into contact with the shaft 86. Accordingly, when a hydraulic pressure in the first pressure chamber 83 is equal to that in the second pressure chamber 84, the piston 82 is located at a position as indicated in FIG. 1, whereby the second pressure chamber 84 communicates with the fluid chamber 85, while its fluid communication with the first pressure chamber 83 is always blocked.

In the auxiliary cylinder 80, the first pressure chamber 83 communicates with the boost chamber 20a of the hydraulic booster 20 through a port 83a, the hydraulic circuit 72 and the port 20d, while the second pressure chamber 84 communicates with the wheel brake cylinders 53a, 54a through a port 84a and the hydraulic circuit 72a or a part of the second hydraulic circuit. The fluid chamber 85 communicates with the reservoir 41 through a port 85a and the hydraulic circuit 70 provided as a drain circuit. Accordingly, the second pressure chamber 84 is substantially under the atmospheric pressure in the condition as shown in FIG. 1. When the hydraulic pressure from the hydraulic booster 20 is applied to the first pressure chamber 83 and the piston 82 slides toward a closed end of the cylinder body 81 against a biasing force of the spring 89, the valve member 87 is moved away from the shaft 86, so that the sperical head of the valve member 87 closes the communication hole 82e by a biasing force of the spring 88. Accordingly, since the second pressure chamber 84 is closed, the hydraulic pressure in the second pressure chamber 84 is increased in response to motion of the piston 82 sliding toward the closed end of the cylinder body 81.

The power source 40 comprises a fluid pump 43 driven by an electric motor 42 and is so structured that its input side is connected to the reservoir 41 while its output side is connected to an accumulator 44 via a check valve 45, and the hydraulic power pressure is supplied to necessary portions via the accumulator 44. Further, the electric motor 42 is intermittently controlled in response to a signal of a pressure sensor (not shown), so that the hydraulic power pressure is maintained to be at a predetermined value.

The operation of the above described embodiment will now be explained. When the brake pedal 2 is not depressed as shown in FIG. 1, the pressure chamber 12 of the master cylinder 10 communicates with the fluid chamber 13, the former communicating with the wheel brake cylinders 51a, 52a and the latter communicating with the reservoir 41 respectively, so that the brake fluid filled in these chambers is under a pressure equal to the pressure in the reservoir 41, that is, substantially under the atmospheric pressure. When the power source 40 operates, the hydraulic power pressure is applied to the hole 27c of the hydraulic booster 20. However, the hydraulic booster 20 is inoperative as long as the hole 27c is closed as shown in FIG. 1. In this condition, the boost chamber 20a of the hydraulic booster 20 communicates with the reservoir 41 via the communication hole 27b and is substantially under the atmospheric pressure, so that the first pressure chamber 83 of the auxiliary cylinder 80 which communicates with the boost chamber 20a through the hydraulic circuit 72 is also under the atmospheric pressure. Accordingly, the piston 82 which is biased by the spring 89 comes to contact with the closure member 81a, so that the communication hole 82e opens. Namely, the second pressure chamber 84 communicates with the fluid chamber 85, so that the wheel brake cylinders 53a, 54 are under the atmospheric pressure.

When the brake pedal 2 is depressed, the reaction piston 22 is pushed by the input rod 3. And, when the reaction piston 22 is moved until it abuts on the power piston 5, the control lever 25 is rotated counterclockwise with respect to the support lever 24 so that the head of the control lever 25 pushes the spool 26. Thereby, the hydraulic power pressure is introduced from the power source 40 into the boost chamber 20a to push the power piston 5, so that the boost force is applied to the master piston 11, and the reaction force is transmitted to the brake pedal 2 via the reaction piston 22. Simultaneously, the hydraulic pressure is supplied from the port 20d to the first pressure chamber 83 of the auxiliary cylinder 80. Thereby, after the communication hole 82e is closed by the valve member 87 with the piston 82 moved, the second pressure chamber 84 is reduced in volume in response to the sliding motion of the piston 82, so that a hydraulic pressure corresponding to the hydraulic pressure discharged from the hydraulic booster 20 is applied to each of the wheel brake cylinders 53a, 54a. When the master piston 11 starts to slide by the action of the power piston 5, the small hole 11d is closed by the valve member 14a, and then the hydraulic braking pressure is generated and discharged to each of the wheel brake cylinders 51a, 52a in accordance with the reduction of volume of the pressure chamber 12. A hydraulic pressure in the boost chamber 20d is regulated to a predetermined hydraulic pressure with the spool valve 28 operated by the control lever 25 in response to the relative displacement of the power piston 5 to the reaction piston 22 When the depressing force of the brake pedal 2 is released, the present system operates in the reverse manner and returns to the condition shown in FIG. 1.

In the case where leakage of the brake fluid occurs in the wheel brake cylinders 53a, 54a or the hydraulic circuit 72a, the brake fluid might flow out of the auxiliary cylinder 80 and the wheel brake cylinders 53a, 54a if the second pressure chamber 84 was so arranged to communicate with the first pressure chamber 83 in the auxiliary cylinder 80. However, since the second pressure chamber 84 is separated from the first pressure chamber 83, the brake fluid filled in the hydraulic circuit from the first pressure chamber 83 to the power source 40 including these devices will never flow out of them. Accordingly, the hydraulic booster 20 maintains its boosting function to the master cylinder 10, so that the braking force to each of the wheel brake cylinders 51a, 52a is sufficiently ensured.

In the above embodiment, as the auxiliary cylinder 80, a cylinder similar in structure to the master cylinder 10 may be used. Further, the front road wheels 51, 52 and the rear road wheels 53, 54 may be inverted each other to connect the front road wheels 51, 52 with the hydraulic booster 20 through the auxiliary cylinder 80.

Figure 2:
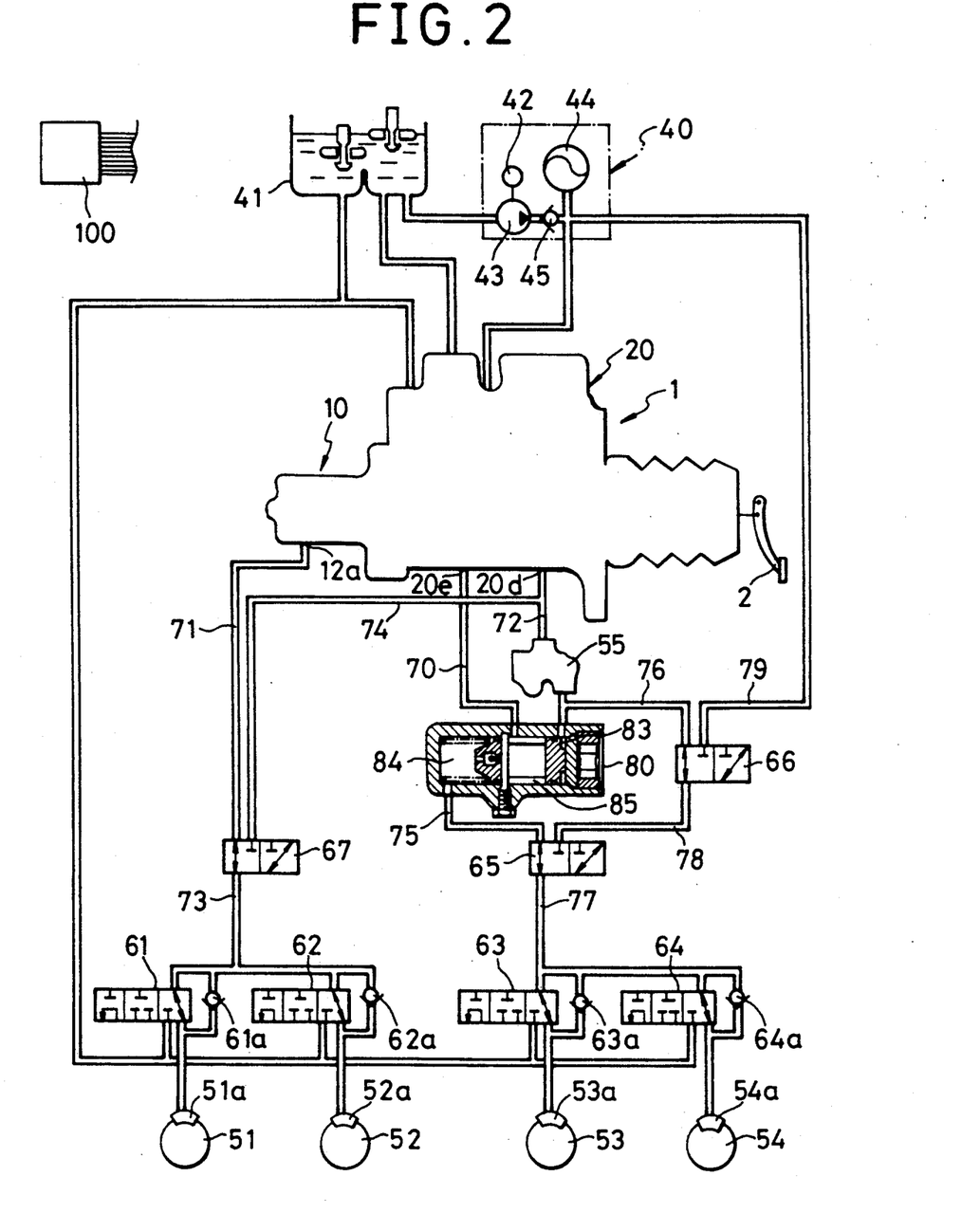
FIG. 2 is a schematic illustration of a hydraulic braking system of a second embodiment of the present invention.

FIG. 2 shows another embodiment of the present invention, in which the anti-locking and anti-slip operations may be performed and in which like reference numerals denote like elements shown in FIG. 1, and the detailed description of the elements will be omitted. In this embodiment, a proportioning valve 55 is disposed in the hydraulic circuit communicating with the rear road wheels 53, 54 and is so structured that the hydraulic pressure discharged from the hydraulic booster 20 is reduced at a predetermined rate so as to approximate to an ideal distribution of the braking force. Namely, the proportioning valve 55 whose structure is known in the art is interposed in the hydraulic circuit 72, and the hydraulic pressure from the hydraulic booster 20 is reduced on the basis of a pressure-reduction rate which is preset according to an input/output area ratio of a stepped piston in the proportioning valve 55, so that the reduced hydraulic pressure is applied to the auxiliary cylinder 80. The proportioning valve of this type is normally disposed between the pressure generator 1 and the wheel brake cylinders 53a, 54a mounted on the rear road wheels 53, 54. Therefore, if the proportioning valve is disposed between the auxiliary cylinder 80 and the wheel brake cylinders 53a, 54a for the normal braking operation, it is necessary for a system functioning the anti-locking operation to be provided with a pair of proportioning valves for regulating the hydraulic pressure supplied from the hydraulic booster 20 to each of the wheel brake cylinders 53a, 54a. In the present embodiment, however, only one proportioning valve 55 is interposed between the auxiliary cylinder 80 and the hydraulic booster 20 to reduce the hydraulic pressure supplied to the wheel brake cylinders 53a, 54a in any case.

The port 20d of the hydraulic booster 20 communicates with the wheel brake cylinders 53a, 54a mounted on the rear road wheels 53, 54, or driving wheels in the present embodiment, through the hydraulic circuit 72, the proportioning valve 55, the auxiliary cylinder 80, hydraulic circuits 75, 77 provided as a part of the second hydraulic circuit, a first changeover valve 65 and control valves 63, 64. The port 12a in the master cylinder 10 communicates with the wheel brake cylinders 51a, 52a mounted on the front road wheels 51, 52 through hydraulic circuits 71, 73 provided as a part of the first hydraulic circuit, a third changeover valve 67 and control valves 61, 62. Further, the hydraulic booster 20 communicates with the third changeover valve 67 through a hydraulic circuit 74.

An output port of the proportioning valve 55 communicates with the first pressure chamber 83 of the auxiliary cylinder 80 and also communicates with a second changeover valve 66 through a hydraulic circuit 76 provided as a bypass circuit with a hydraulic circuit 78, through which the second changeover valve 66 communicates with the first changeover valve 65. Further, the power source 40 communicates with the second changeover valve 66 through a hydraulic circuit 79 provided as a power circuit. The fluid chamber 85 of the auxiliary cylinder 80 communicates with a port 20e, which is formed in the hydraulic booster 20, through the hydraulic circuit 70 or the drain circuit, and the port 20e communicates with the reservoir 41 through an internal flow passage (not shown) in the hydraulic booster 20.

The first changeover valve 65 is formed of a three ports-two positions solenoid operated valve which is normally positioned in a first operating position where the hydraulic circuits 75, 77 communicates with each other and the hydraulic circuit 78 is closed, and which is changed over in its operative condition to a second operating position where the hydraulic circuits 77, 78 communicates with each other and the hydraulic circuit 75 is closed. The second changeover valve 66 is also formed of a three ports-two positions solenoid operated valve which normally closes the hydraulic circuit 79 and communicates the hydraulic circuit 76 with the hydraulic circuit 78, so that the first changeover valve 65 communicates with the hydraulic booster 20 via the proportioning valve 55. The second changeover valve 66 closes the hydraulic circuit 76 in its operative condition and communicates the hydraulic circuit 78 with the hydraulic circuit 79, so that the first changeover valve 65 communicates with the power source 40. Further, the third changeover valve 67 is also formed of a three ports-two positions solenoid operated valve which normally communicates the hydraulic circuit 71 with the hydraulic circuit 73. In its operative condition, the hydraulic circuits 73, 74 communicates with each other to communicate with the hydraulic booster 20.

The first, second and third changeover valves 65, 66 and 67 are controlled by a controller 100 which receives an output signal from a fluid sensor (not shown) provided in the reservoir 41 or an output signal from a pressure sensor (not shown) provided in the power source 40. In the normal condition, all of the changeover valves 65, 66 and 67 are inoperative as shown in FIG. 2. In the anti-locking operation, while the second changeover valve 66 is inoperative, the first and third changeover valves 65, 67 operate. In the anti-slip operation to the rear road wheels 53, 54 or the driving wheels, while the third changeover valve 67 is inoperative, the first changeover valve 65 first operates and then the second changeover valve 66 operates. When a shortage of brake fluid is detected by the fluid sensor, for instance, the first and third changeover valves 65, 67 are rendered to be inoperative, that is, changed into the position in the normal condition, or when a reduction of hydraulic power pressure is detected by the pressure sensor, the first and third changeover valves 65, 67 are controlled in the same manner. Thereby, the brake fluid is prevented from flowing out of the hydraulic booster 20 and the hydraulic circuits connected thereto in the case where the hydraulic power pressure of the power source 40 disappears or other cases.

Each of the control valves 61, 62 is formed of a three ports-three positions solenoid valve, and is so arranged that each of the wheel brake cylinders 51a, 52a communicates with the third changeover valve 67 in its first operating position, the communication therebetween is blocked in its second operating position and each of the wheel brake cylinders 51a, 52a communicates with the reservoir 41 in its third operating position. In its normal condition, the ordinal braking operation is carried out in the first operating position, and in the anti-locking operation, the first to third operating positions are selectively positioned to regulate the hydraulic braking pressure in response to locking condition of the front road wheels 51, 52. As for the rear road wheels 53, 54, the control valves 63, 64 of the same type as described above are connected to the wheel brake cylinders 53a, 54a.

In operation of the above embodiment, when the first, second and third changeover valve 65, 66, 67 and the control valves 61 to 64 are positioned as shown in FIG. 2 in the normal braking operation, the front road wheels 51, 52 are braked in response to the hydraulic braking pressure from the master cylinder 10 and the rear road wheels 53, 54 are braked in response to the hydraulic pressure from the hydraulic booster 20. When an excessive amount of slip of each of the road wheels 51 to 54 is detected in the braking operation and then the anti-locking operation is initiated, the first changeover valve 65 and third changeover valve 67 are actuated by the controller 100, and the hydraulic pressure discharged from the hydraulic booster 20 is supplied to the control valves 61 to 64. Then, the three operating positions in each of the control valves 61 to 64 are selectively positioned depending upon the locking condition of the front and rear road wheels 51 to 54 to regulate the hydraulic braking pressure in each of the wheel brake cylinders 51a to 54a.

In starting or accelerating operation of the vehicle, when an excessive amount of slip of each of the rear road wheels 53, 54 or the driving wheels, is detected in the controller 100, the first changeover valve 65 operates to close the hydraulic circuit 75. Next, the second changeover valve 66 operates and then the hydraulic power pressure is applied to each of the wheel brake cylinders 53a, 54a, whereby the rear road wheels 53, 54 are braked irrespective of operation of the brake pedal 2. Namely, the operation of each of the control valves 63, 64 is controlled by the controller 100, so that the hydraulic pressure in each of the wheel brake cylinders 53a, 54a is increased, decreased or held depending upon the slip condition of the rear road wheels 53, 54 and the excessive rotation is suppressed to prevent the slip of the rear road wheels 53, 54.

Thus, the hydraulic power pressure generated by the power source 40 is in the stand-by condition in the second changeover valve 66 until the first changeover valve 65 operates. When the first changeover valve 65 operates, it first communicates with the hydraulic booster 20 via the second changeover valve 66 and the proportioning valve 55, with the hydraulic circuit 75 closed, so that the power source 40 never communicates with the hydraulic circuit 75. Even if any one of the first and second changeover valves 65, 66 does not operate, the hydraulic power pressure is not supplied to the hydraulic circuit 77. Therefore, a fail-safe is effectuated with a combination of the above changeover valves 65, 66. In the case where the hydraulic pressure is not discharged from the hydraulic booster 20 due to loss of the hydraulic power pressure in the power source 40 or other defects, the first changeover valve 65 is rendered to be inoperative as described above, and the third changeover valve 67 is also rendered to be inoperative, whereby the fail-safe is effectuated. Of course, this embodiment functions as the embodiment in FIG. 1 does. If leakage of the brake fluid occurs in each of the wheel brake cylinders 53a, 54a or the hydraulic circuit 77, the first changeover valve 65 is rendered to be inoperative, so that the communication between the first changeover valve 65 and the hydraulic booster 20 is blocked by the auxiliary cylinder 80. Thereby, the leakage of the brake fluid is restrained to the minimum, so that the hydraulic booster 20 maintains its boosting function.

Figure 3:
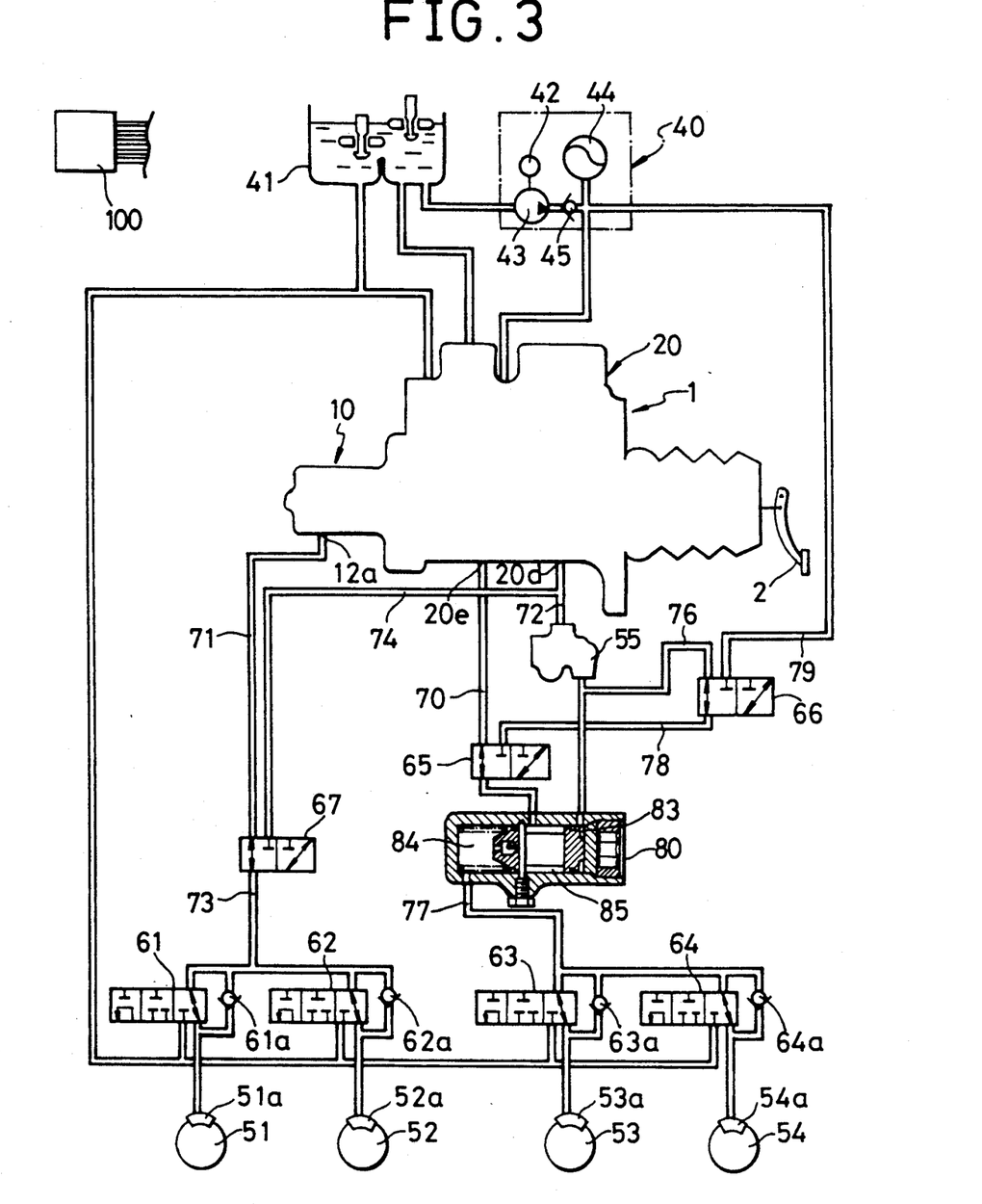
FIG. 3 is a schematic illustration of a hydraulic braking system of a third embodiment of the present invention.

FIG. 3 shows a further embodiment of the present invention, which differs from the embodiment shown in FIG. 1 in the arrangement of the first and second changeover valves 65, 66. The remaining structure is essentially same as that illustrated in FIG. 2. In this embodiment, the first changeover valve 65 is interposed in the hydraulic circuit 70, or the drain circuit, which communicates the auxiliary cylinder 80 with the port 20e of the hydraulic booster 20 communicating with the reservoir 41. An output port of the second changeover valve 66 communicates with an input port of the first changeover valve 65 through the hydraulic circuit 78 provided as a part of the bypass circuit. An input port of the second changeover valve 66 communicates with the proportioning valve 55 through the hydraulic circuit 76 provided as a part of the bypass circuit, and its other input port communicates with the power source 40 through the hydraulic circuit 79 or the power circuit. The second pressure chamber 84 of the auxiliary cylinder 80 directly communicates with each of the control valves 63, 64.

The first changeover valve 65 is normally positioned in a first operating position where the hydraulic circuit 78 is closed and the fluid chamber 85 communicates with the reservoir 41, and is changed over in its operative condition to a second operating position where the fluid chamber 85 communicates with the second changeover valve 66 through the hydraulic circuit 78 and the communication between the fluid chamber 85 and the reservoir 41 is blocked. The second changeover valve 66 is normally positioned in a first operating position where the hydraulic circuits 76, 78 communicate with each other and the hydraulic circuit 79 is closed, and is changed over in its operative condition to a second operating position where the hydraulic circuit 76 is closed and the hydraulic circuits 78, 79 communicate with each other.

Accordingly, in the normal braking operation, the first to third changeover valves 65 to 67 and the control valves 61 to 64 are positioned as shown in FIG. 3, so that the front road wheels 51, 52 are braked in response to the hydraulic braking pressure from the master cylinder 10, and the rear road wheels 53, 54 are braked in response to the hydraulic pressure from the hydraulic booster 20.

When an excessive amount of slip of each of the road wheels 51 to 54 is detected in the braking operation, and the anti-locking operation is initiated, the first and third changeover valves 65, 67 are actuated by the controller 100. Then, the hydraulic pressure discharged from the hydraulic booster 20 is applied to the control valves 63, 64 through the auxiliary cylinder 80, and the hydraulic pressure discharged from the hydraulic booster 20 is directly applied to the control valves 61, 62. Consequently, the anti-locking operation is carried out in the same manner as the embodiment in FIG. 2.

In starting or accelerating operation of the vehicle, when an excessive amount of slip of each of the rear road wheels 53, 54 or the driving wheels is detected, the first changeover valve 65 first operates and then the second changeover valve 66 operates to apply the hydraulic power pressure to each of the wheel brake cylinders 53a, 54a. Thus, the anti-slip operation is carried out in the same manner as the embodiment in FIG.2. Accordingly, the hydraulic power pressure generated by the power source 40 is normally in the stand-by condition in the second changeover valve 66 until the first changeover valve 65 operates When the first changeover valve 65 operates, the first changeover valve 65 first communicates with the hydraulic booster 20 via the proportioning valve 55 and the communication between the first changeover valve 65 and the reservoir 41 is blocked. Therefore, the power source 40 never communicates with the reservoir 41.

It should be apparent to one skilled in the art that the above-described embodiments are merely illustrative of but a few of the many possible specific embodiments of the present invention. Numerous and various other arrangements can be readily devised by those skilled in the art without departing from the spirit and scope of the invention as defined in the following claims.

What is claimed is:

1. A hydraulic braking system for an automotive vehicle comprising:
   a power source for generating a hydraulic power pressure;
   a reservoir for storing an amount of brake fluid;
   a master cylinder for introducing said brake fluid thereinto from said reservoir and generating a hydraulic braking pressure in response to operation of a manually-operated member;
   a hydraulic booster for actuating said master cylinder by said hydraulic power pressure supplied from said power source in response to operation of said manually-operated member;

a plurality of wheel brake cylinders for braking respective road wheels, said wheel brake cylinders being divided into a first group of wheel brake cylinders communicating with said master cylinder through a first hydraulic circuit and a second group of wheel brake cylinders communicating with said hydraulic booster through a second hydraulic circuit; and an auxiliary cylinder disposed in said second hydraulic circuit, said auxiliary cylinder comprising a cylinder body having a cylinder bore defined therein and a piston axially slidably disposed within said cylinder bore, said piston dividing said cylinder bore into a first chamber communicating with said hydraulic booster and a second chamber communicating with said second group of wheel brake cylinders, and said piston blocking a fluid communication between said first chamber and said second chamber, wherein said piston of said auxiliary cylinder forms within said cylinder bore a third chamber communicating with said reservoir through a drain circuit, and wherein said piston is equipped with a valve mechanism for normally communicating with second chamber with said third chamber, and blocking the communication therebetween when a hydraulic pressure supplied from said hydraulic booster to said first chamber exceeds a hydraulic pressure in said second chamber.

2. A hydraulic braking system for an automotive vehicle as set forth in claim 1, further comprising a proportioning valve disposed in said second hydraulic circuit at a point thereof between said hydraulic booster and said first chamber of said auxiliary cylinder.

3. A hydraulic braking system for an automotive vehicle as set forth in claim 2, further comprising a bypass circuit connecting a point of said second hydraulic circuit between said proportioning valve and said first chamber of said auxiliary cylinder to a point of said second hydraulic circuit between said second chamber of said auxiliary cylinder and said second group of wheel brake cylinders, and a normally-closed valve disposed in said bypass circuit for normally shutting off said bypass circuit.

4. A hydraulic braking system for an automotive vehicle as set forth in claim 3, wherein said normally-closed valve comprises a first changeover valve disposed in said bypass circuit and selectively placed in one of a first operating position for shutting off said bypass circuit and communicating said second chamber of said auxiliary cylinder with said second group of wheel brake cylinders, and a second operating position for communicating said proportioning valve with said second group of wheel brake cylinders through said bypass circuit and blocking the communication between said second chamber of said auxiliary cylinder and said second group of wheel brake cylinders.

5. A hydraulic braking system for an automotive vehicle as set forth in claim 4, further comprising valve means disposed in said second hydraulic circuit at a point thereof between said first changeover valve and each of said second group of wheel brake cylinders for controlling the communication therebetween and the communication between said second group of wheel brake cylinders and said reservoir in response to locking condition of said road wheels.

6. A hydraulic braking system for an automotive vehicle as set forth in claim 5, further comprising a second changeover valve disposed in said bypass circuit at a point thereof between said proportioning valve and said first changeover valve, and connected to said power source through a power circuit, said second changeover valve being selectively placed in one of a first operating position for shutting off said power circuit and communicating said proportioning valve with said first changeover valve, and a second operating position for communicating said power source with said first changeover valve and blocking the communication between said proportioning valve and said first changeover valve.

7. A hydraulic braking system for an automotive vehicle as set forth in claim 2, wherein said piston of said auxiliary cylinder forms within said cylinder bore a third chamber communicating with said reservoir through a drain circuit, and wherein said piston is equipped with a valve mechanism for normally communicating said second chamber with said third chamber, and blocking the communication therebetween when a hydraulic pressure supplied from said hydraulic boosted to said first chamber through said proportioning valve exceeds a hydraulic pressure in said second chamber.

8. A hydraulic braking system for an automotive vehicle as set forth in claim 7, further comprising:

a bypass circuit connecting a point of said second hydraulic circuit between said proportioning valve and said first chamber of said auxiliary cylinder to said drain circuit;

a first changeover valve disposed in said bypass circuit and selectively placed in one of a first operating position for shutting off said bypass circuit and communicating said third chamber of said auxiliary cylinder with said reservoir through said drain circuit, and a second operating position for communicating said proportioning valve with said third chamber of said auxiliary cylinder through said drain circuit and blocking the communication between said third chamber of said auxiliary cylinder and said reservoir; and valve means disposed in said second hydraulic circuit at a point thereof between said second chamber of said auxiliary cylinder and each of said second group of wheel brake cylinders for controlling the communication therebetween and the communication between said second group of wheel brake cylinders and said reservoir in response to locking condition of said road wheels.

9. A hydraulic braking system for an automotive vehicle as set forth in claim 8, further comprising a second changeover valve disposed in said bypass circuit at a point thereof between said proportioning valve and said first changeover valve, and connected to said power source through a power circuit, said second changeover valve being selectively placed in one of a first operating position for shutting off said power circuit and communicating said proportioning valve with said first changeover valve, and a second operating position for communicating said power source with said first changeover valve and blocking the communication between said proportioning valve and said first changeover valve.

* * * * *